Figure 1:
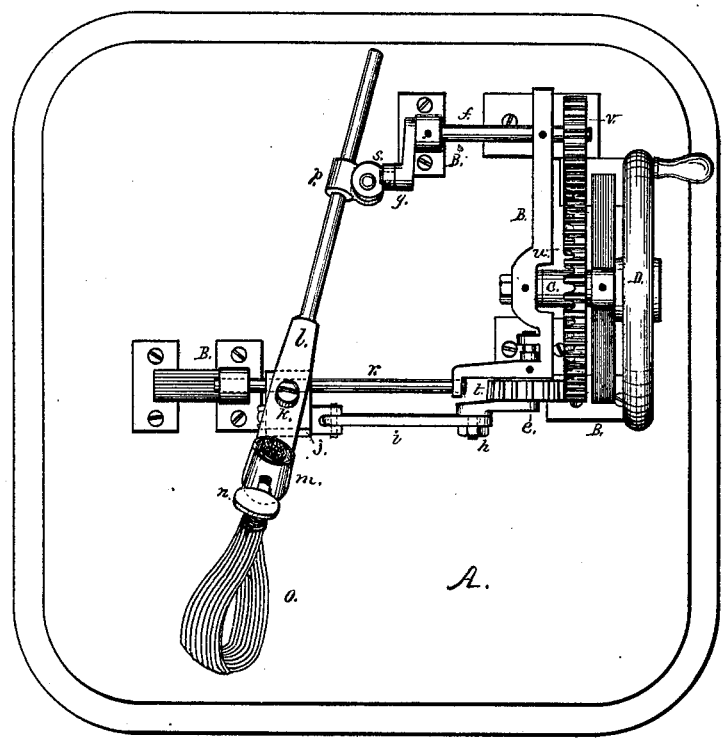

2 Sheets—Sheet 1.

W. C. BURRY.
Egg-Beating Machine.

No. 220,272.     Patented Oct. 7, 1879.

Witnesses
J. J. Johnston
Geo. F. Turner

Inventor
W. C. Burry

W. C. BURRY.
Egg-Beating Machine.
No. 220,272. Patented Oct. 7, 1879.
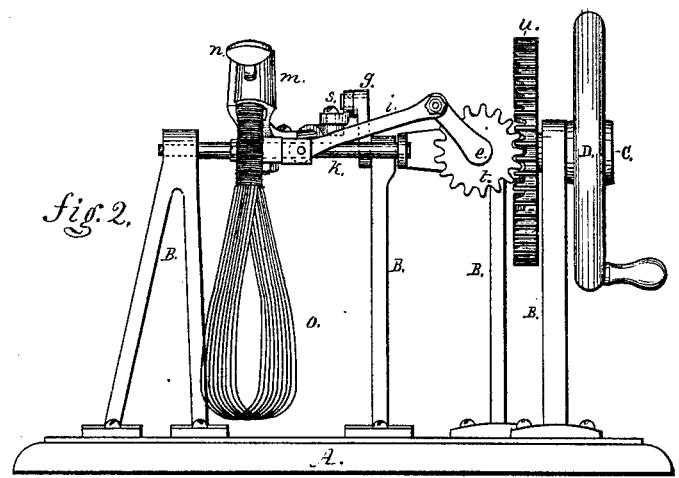
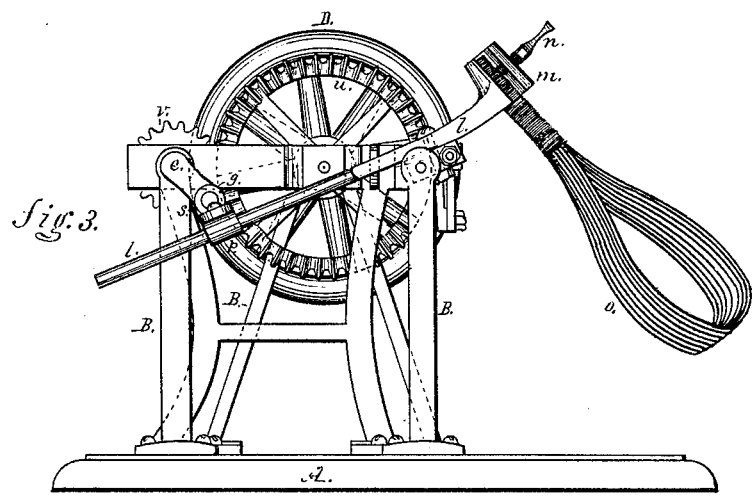

UNITED STATES PATENT OFFICE.

WILLIAM C. BURRY, OF PITTSBURG, PENNSYLVANIA.

IMPROVEMENT IN EGG-BEATING MACHINES.

Specification forming part of Letters Patent No. 220,272, dated October 7, 1879; application filed February 7, 1879.

*To all whom it may concern:*

Be it known that I, WILLIAM C. BURRY, of Pittsburg, in the county of Allegheny and State of Pennsylvania, have invented a new and useful Improvement in Egg-Beating Machines, and I do hereby declare that the following is a full and exact description thereof, reference being had to the accompanying drawings, and to the letters of reference marked thereon.

My invention relates to an improvement in egg-beating machines, and consists in arranging the beater, consisting of a series of bent wires, in a vibrating arm pivoted and operated by driving-gear combined and arranged as hereinafter described.

To enable others skilled in the art to make and use my invention, I will proceed to describe its construction and operation.

In the accompanying drawings, which form part of my specification, Figure 1 is a top view or plan of my improvement. Fig. 2 is a front elevation. Fig. 3 is a side elevation.

In the drawings, A is the base of the machine, to which are secured supports B, having suitable bearings for the crank-shafts $e f$ and driving-shaft C. On the shaft C is a gear-wheel, $u$, having cogs on its periphery and on one side of it. On the shaft C is also arranged a crank-wheel, D.

The cogs on the periphery of the wheel $u$ mesh into the cogs of the small wheel $v$ on the crank-shaft $f$, and the cogs on the side of the wheel $u$ mesh into the cogs of the wheel $t$ on the crank-shaft $e$. On the crank-shaft $e$ is a crank, $h$, to which is pivoted a connecting-arm, $i$, to one end of which is pivoted a piece, $j$, which moves on a rod, $r$.

To the piece $j$ at $k$ is pivoted the vibrating arm $l$, on the front end of which is a socket, $m$, for receiving the beater $o$, which is composed of a series of bent wires, which are secured in the socket $m$ by means of the thumb-screw $n$.

The rear end of the vibrating arm $l$ is placed in a piece, $p$, which at $s$ is pivoted to the crank $g$ on the crank-shaft $f$, the piece $p$ moving on the vibrating arm $l$ in harmony with the crank $g$.

The operation of my improvement is as follows: The vessel holding the eggs to be beaten is placed under the beater $o$, which is adjusted so as to come near the bottom of the vessel. The operator then turns the crank-wheel D, which turns the wheel $u$, which revolves the wheels $t v$, which revolve the crank-shafts $e f$ and cranks $g h$, the crank $g$ imparting to the rear end of the vibrating arm a circular vibratory motion, which imparts to the egg-beater $o$ a corresponding motion combined with a reciprocating motion, which is imparted to it through the medium of the sliding piece $j$ on the rod $r$ and the connecting-arm $i$ and crank $h$, thereby imparting to the beater $o$ the peculiar motion used for beating eggs with a spoon, as in the hands of the housewife.

Having thus described my improvement, what I claim as of my invention is—

In an egg-beater, the vibrating arm $l$, furnished with a beater, $o$, said arm being pivoted to the sliding piece $j$, and operated through the medium of the piece $p$ and arm $i$, pivoted to the cranks $g h$ of the shafts $e f$, operated through the medium of driving-gear, whereby an elliptical vibratory motion is imparted to the beater $o$, substantially as herein described, and for the purpose set forth.

W. C. BURRY.

Witnesses:
A. C. JOHNSTON,
GEO. F. TURNER.